United States Patent
Lerzer et al.

(10) Patent No.: US 11,383,600 B2
(45) Date of Patent: Jul. 12, 2022

(54) METHOD FOR OPERATING A MONITOR OF A MOTOR VEHICLE, AND MOTOR VEHICLE

(71) Applicant: AUDI AG, Ingolstadt (DE)

(72) Inventors: Jürgen Lerzer, Neumarkt (DE); Andreas Prücklmeier, Kelheim (DE)

(73) Assignee: AUDI AG, Ingolstadt (DE)

( * ) Notice: Subject to any disclaimer, the term of this patent is extended or adjusted under 35 U.S.C. 154(b) by 384 days.

(21) Appl. No.: 16/635,118

(22) PCT Filed: Jul. 27, 2018

(86) PCT No.: PCT/EP2018/070434
§ 371 (c)(1),
(2) Date: Jun. 19, 2020

(87) PCT Pub. No.: WO2019/025310
PCT Pub. Date: Feb. 7, 2019

(65) Prior Publication Data
US 2020/0238825 A1    Jul. 30, 2020

(30) Foreign Application Priority Data
Jul. 31, 2017    (DE) ..................... 10 2017 213 177.2

(51) Int. Cl.
*B60K 35/00*    (2006.01)
*B60K 37/02*    (2006.01)
(Continued)

(52) U.S. Cl.
CPC .............. *B60K 35/00* (2013.01); *B60K 37/02* (2013.01); *B60R 1/12* (2013.01); *G06F 3/013* (2013.01);
(Continued)

(58) Field of Classification Search
CPC .. B60K 35/00; B60K 37/02; B60K 2370/149; B60K 2370/21; B60R 1/12;
(Continued)

(56) References Cited

U.S. PATENT DOCUMENTS 4,768,088 A    8/1988  Ando
7,027,621 B1 *  4/2006  Prokoski .............. G06V 40/165
                                                340/576
(Continued)

FOREIGN PATENT DOCUMENTS

DE    10 2011 056 714 A1    7/2012
DE    10 2012 006 966 A1    11/2012
(Continued)

OTHER PUBLICATIONS

English Translation by WIPO dated Feb. 6, 2020 of the International Preliminary Report on Patentability from International Patent Application No. PCT/EP2018/070434.
(Continued)

*Primary Examiner* — James M Pontius
(74) *Attorney, Agent, or Firm* — Staas & Halsey LLP

(57) ABSTRACT

A power consumption of a screen can be lowered while a motor vehicle is traveling, based on a line of vision of a user of the motor vehicle. An image of a surrounding area of the motor vehicle is captured, and a line of vision of the user of the motor vehicle is determined. The screen is switched to a normal mode of operation or a power-saving mode based on the determined line of vision. The power consumption of the screen in the power-saving mode is less than a power consumption of the screen in the normal mode of operation. The image of the surrounding area is displayed by use of the screen, at least while the screen is operated in the normal mode of operation.

18 Claims, 1 Drawing Sheet

(51) Int. Cl.
 *B60R 1/12* (2006.01)
 *G06F 3/01* (2006.01)

(52) U.S. Cl.
 CPC . *B60K 2370/149* (2019.05); *B60R 2001/1215* (2013.01); *B60R 2300/404* (2013.01); *B60R 2300/8026* (2013.01); *B60R 2300/8046* (2013.01)

(58) Field of Classification Search
 CPC ...... B60R 2001/1215; B60R 2300/404; B60R 2300/8026; B60R 2300/8046; B60R 2300/202; B60R 2300/802; B60R 1/00; G06F 3/013; G06F 3/012
 See application file for complete search history.

(56) References Cited

U.S. PATENT DOCUMENTS

| | | | | |
|---|---|---|---|---|
| 2010/0014711 | A1* | 1/2010 | Camhi | B60K 35/00 382/104 |
| 2013/0106681 | A1* | 5/2013 | Eskilsson | G06V 40/18 345/156 |
| 2015/0328985 | A1* | 11/2015 | Kim | A61B 5/163 180/272 |
| 2016/0031370 | A1* | 2/2016 | McElroy | B60R 1/00 348/148 |
| 2016/0131911 | A1* | 5/2016 | Border | G06F 3/012 345/8 |
| 2016/0297362 | A1 | 10/2016 | Tijerina et al. | |
| 2017/0088053 | A1 | 3/2017 | Orellana et al. | |
| 2017/0219833 | A1* | 8/2017 | Mayama | H04N 5/66 |
| 2017/0336661 | A1* | 11/2017 | Harrold | G02B 6/0016 |
| 2018/0312111 | A1* | 11/2018 | Bongwald | B60R 1/00 |
| 2019/0025589 | A1* | 1/2019 | Haddick | G02B 27/0172 |
| 2020/0143585 | A1* | 5/2020 | Seiler | G06T 19/006 |
| 2020/0201349 | A1 | 6/2020 | Ha | G08G 1/166 |
| 2021/0122469 | A1* | 4/2021 | Wu | B64D 11/00154 |
| 2021/0197724 | A1* | 7/2021 | Gu | G06V 40/171 |

FOREIGN PATENT DOCUMENTS

| | | |
|---|---|---|
| DE | 10 2012 206 030 A1 | 10/2013 |
| DE | 10 2012 019 508 A1 | 4/2014 |
| DE | 10 2015 202 846 A1 | 8/2015 |
| DE | 11 2014 004 889 T5 | 8/2016 |
| DE | 10 2016 116 839 A1 | 3/2017 |
| DE | 10 2017 213 177.2 | 7/2017 |
| EP | 3 040 809 A1 | 7/2016 |
| TW | I581991 B | 5/2017 |
| WO | PCT/EP2018/070434 | 7/2018 |

OTHER PUBLICATIONS

International Search Report dated Sep. 24, 2018 from International Application No. PCT/EP2018/070434, 4 pages.

German Office Action dated May 4, 2018 from German Patent Application No. 10 2017 213 177.2, 8 pages.

* cited by examiner

METHOD FOR OPERATING A MONITOR OF A MOTOR VEHICLE, AND MOTOR VEHICLE

CROSS REFERENCE TO RELATED APPLICATIONS

This application is a U.S. national stage of International Application No. PCT/EP2018/070434, filed on Jul. 27, 2018. The International Application claims the priority benefit of German Application No. 10 2017 213 177.2 filed on Jul. 31, 2017. Both the International Application and the German Application are incorporated by reference herein in their entirety.

BACKGROUND

Described herein is a method for operating a screen of a motor vehicle. Also described herein is a motor vehicle that is configured for example to perform the method.

Screens in a motor vehicle are known. By way of example, the screen may be part of an entertainment system, of a navigation system or of an information system of the motor vehicle. The content of the screen can be presented on the basis of a line of vision of a user, for example a driver, of the motor vehicle.

By way of example, German Patent Application 10 2011 056 714 A1 describes a system and a method for activating a visual control interface and for example for activating a visual control interface by using an eye tracking system in a vehicle. The system permits a driver of a vehicle to signal to the system by selecting the switch, to activate and deactivate the control section and in this way to provide the driver with function support on request, but otherwise to remain unobtrusive.

European Patent Application 3 040 809 A1 describes a system for controlling a human-machine interface in a motor vehicle having at least two screens. This involves a line of vision of a driver of the motor vehicle being ascertained. This is taken as a basis for ascertaining which of the at least two screens is closest to the line of vision of the driver. On the basis of the line of vision, a function of the screen closest to the line of vision can be automatically adapted.

German Patent Application 11 2014 004 889 T5 relates to a system containing an eye tracker that is designed to provide eye data corresponding to a line of vision of a user. At least one processor is designed to analyze the eye data in order to determine whether a display is in a central field of vision of the user, or whether the display is in a peripheral field of vision of the user. The processors are further designed to provide different types of image data for the display, on the basis of whether the display is in the central field of vision or the peripheral field of vision.

Additionally known from the related art are rearview mirrors for observing a traffic situation to the rear in a motor vehicle. Rearview mirrors can be referred to as interior mirrors or side mirrors, or exterior mirrors. In this case, the interior mirror is arranged in an interior of the motor vehicle. Exterior mirrors or side mirrors may be arranged on one or both sides of the motor vehicle, for example in the region of an A pillar of the motor vehicle, externally on the motor vehicle.

Additionally, it is known practice to replace exterior mirrors of the motor vehicle with a combination of a camera and a screen. In this case, the rear region of the motor vehicle can be captured by use of the camera and presented for the driver of the motor vehicle by use of the screen. On account of smaller dimensions of the camera in comparison with a mirror, this allows an air resistance of the motor vehicle to be lowered. This results in a lower power consumption and a longer range. This is beneficial for example for the aspect of progressive electromobility, where the power consumption during travel is particularly directly correlated with a possible range and/or a battery capacity that needs to be held.

SUMMARY

Described herein are examples to lower a power consumption while a motor vehicle is traveling.

A method for operating a screen of a motor vehicle is described herein. The method may include the operations of: capturing an image of a surrounding area of the motor vehicle, ascertaining a line of vision of a user of the motor vehicle, switching the screen to a normal mode of operation or a power-saving mode on the basis of the ascertained line of vision, wherein a power consumption of the screen is reduced in the power-saving mode in comparison with the normal mode of operation, and displaying the image of the surrounding area by use of the screen, at least while the normal mode of operation is prescribed for the screen.

The surrounding area of the motor vehicle from which the image is captured is situated behind the motor vehicle, at least in part, for example. For example, the image is captured from a surrounding area of the motor vehicle to the rear. The image of the surrounding area can subsequently be displayed on the screen. In some embodiments, the image is displayed on the screen both in the power-saving mode and in the normal mode of operation. In other embodiments, the image is displayed by the screen only in the normal mode of operation thereof. The image can be an image signal or a video signal.

To ascertain the line of vision, the user can be captured by use of a camera. The line of vision will then be ascertained by evaluating an output signal of the camera. For example, there is provision for the line of vision of the user to be taken as a basis for switching the screen to the normal mode of operation if the user is looking in the direction of the screen and/or is viewing the screen. By way of example, the screen is switched to the power-saving mode if the user is not looking in the direction of the screen and/or is not looking at the screen. For example, the screen is not switched from the normal mode of operation to the power-saving mode until the user has not looked in the direction of the screen for a predetermined period of time. By way of example, the screen is initially in the normal mode of operation, since the user is looking in the direction of the screen. A timer is started if the user averts his eyes from the screen. As soon as the timer has reached a predetermined time threshold value, the screen is switched to the power-saving mode and the user has not looked in the direction of the screen again in the meantime. If the user looks in the direction of the screen, the timer is advantageously reset.

By way of example, the screen is switched off or has its brightness reduced in the power-saving mode. If the screen has its brightness reduced, the image of the surrounding area of the motor vehicle can also be displayed on the screen in the power-saving mode. Alternatively, there may be provision for a screen saver, for example a black image, to be displayed with reduced brightness in the power-saving mode.

One development provides for the ascertaining of the line of vision to involve the line of vision being predictively forecast and for the screen to be switched to the normal mode of operation or the power-saving mode on the basis of a forecast line of vision. In other words, the screen is additionally or exclusively switched to the normal mode of operation or to the power-saving mode on the basis of the forecast line of vision. This ensures that the screen is already back in the normal mode of operation in good time when the driver or the user looks in the direction thereof.

One development provides for the capture and display of the image to result in a function of a side mirror and/or rearview mirror of the motor vehicle being simulated. For example, the image of the surrounding area of the motor vehicle to the rear is captured in this case. The screen may be arranged in the interior of the motor vehicle in the region of an A pillar of the motor vehicle in this case.

One development provides for the normal mode of operation or the power-saving mode for the screen to be additionally engaged on the basis of a running state of the motor vehicle. By way of example, the running state of the motor vehicle relates to a road on which the motor vehicle travels, or a velocity of the motor vehicle. By way of example, there is provision for the screen to be switched to the normal mode of operation whenever the velocity of the motor vehicle is above a predetermined velocity limit value. In another example, there is provision for the screen to be switched to the normal mode of operation whenever the motor vehicle travels on a freeway and/or a road expanded to at least four lanes. In this case, the power saving during operation of the screen and a high safety level can be combined.

One development provides for the image to be used to detect a road user as a critical object on the basis of the object type, relative position and/or relative velocity of the road user in relation to the motor vehicle, and the normal mode of operation to always be prescribed for the screen while the critical object is detected.

For example, the road user is detected as a critical object if the road user overtakes the motor vehicle and/or is in the blind spot of the motor vehicle. As a result of the normal mode of operation always being prescribed for the screen while the critical object is detected, it is ensured that the user or the driver can detect the road user in the image of the surrounding area at all times. The road user may be another motor vehicle, a pedestrian or a cyclist, for example.

One development provides for the critical object to be highlighted on the screen in the normal mode of operation. In other words, the critical object is highlighted and/or identified in the image when it is displayed on the screen. By way of example, the critical object is identified by a marker, a frame and/or a coloration. The identification of the critical object on the screen can be produced in the style of augmented reality, for example. In this way, the visibility of the critical object on the screen for the user can be combined with the power saving particularly well. The highlighting of the critical object can be developed by virtue of a criticality level additionally being detected for the critical object on the basis of the image, and the criticality level being identified on the basis of the highlighting of the critical object. By way of example, the criticality level indicates how close the road user detected as the critical object is relative to the motor vehicle. Alternatively or additionally, the criticality level can indicate how likely a collision between the motor vehicle and the road user detected as the critical object would be in the event of a predetermined driving maneuver by the motor vehicle. The predetermined driving maneuver may be a lane change on a multilane road, for example.

A further aspect relates to a motor vehicle having an image capture unit, for example a camera, for capturing an image of a surrounding area of the motor vehicle, an ascertaining unit for ascertaining a line of vision of a user of the motor vehicle, a screen for displaying the image of the surrounding area by use of the screen, at least while a normal mode of operation is prescribed for the screen, and a control unit for switching the screen to the normal mode of operation or a power-saving mode on the basis of the ascertained line of vision, wherein a power consumption of the screen is reduced in the power-saving mode in comparison with the normal mode of operation.

For example, the motor vehicle is configured to perform a method of the type described herein. The motor vehicle is for example an automobile, for example a car. The ascertaining unit can include a camera. The camera of the ascertaining unit is for example oriented to a driver's seat of the motor vehicle.

One development provides for the motor vehicle to have the image capture unit, the ascertaining unit, the screen and the control unit instead of a side mirror and/or rearview mirror. For example, the components described herein replace or simulate the function of the exterior mirror and/or rearview mirror. By dispensing with the exterior mirror, the power consumption while the motor vehicle is traveling can be lowered particularly well.

Developments of the method described herein have features as have already been described in connection with the developments of the motor vehicle described herein. For this reason, the corresponding developments of the method described herein are not described again at this juncture.

BRIEF DESCRIPTION OF THE DRAWINGS

These and other aspects and advantages will become more apparent and more readily appreciated from the following description of the exemplary embodiments, taken in conjunction with the accompanying drawings, of which.

DETAILED DESCRIPTION

Figure 1:
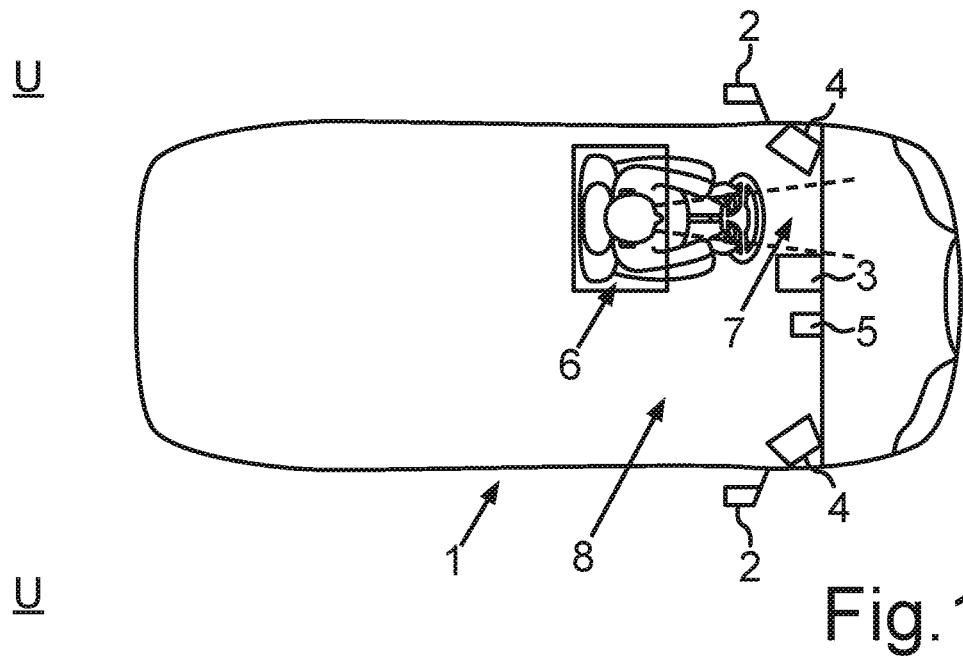
FIG. 1 is a schematic plan view of a motor vehicle.

Reference will now be made in detail to examples which are illustrated in the accompanying drawings.

The exemplary embodiments explained below are example embodiments of the disclosure. In the example embodiments, the components described for the embodiments are each individual features that are able to be considered independently of one another, that each also develop the disclosure independently of one another and hence that can also be regarded as part of the disclosure individually or in a different combination than that shown. In addition, the embodiments described are also augmentable by further already described features.

In the drawings, elements having the same function are each provided with the same reference signs.

FIG. 1 shows a motor vehicle 1 having an image capture unit 2, a screen 4, an ascertaining unit 3 and a control unit 5, wherein the parts together form a system 8 for substituting an exterior mirror. In the present case, the motor vehicle 1 includes two image capture units and two screens 4, which each replace an exterior mirror. An image capture unit 2 and a screen 4 on a left-hand side of the motor vehicle 1, or on a driver's side of the motor vehicle 1, replace a left-hand exterior mirror of the motor vehicle 1. A screen 4 and an image capture unit 2 on a right-hand side of the motor vehicle 1, or on a passenger side of the motor vehicle 1, replace a right-hand exterior mirror of the motor vehicle 1.

The image capture unit 2 and screen 4 on one side of the motor vehicle 1 accordingly form a pair. The text below refers to the image capture unit 2 and the screen 4 in the singular, with both pairs of image capture units 2 and screens 4 then being meant.

The image capture unit 2 is for example embodied as a camera. The image capture unit 2 captures an image of a surrounding area U of the motor vehicle 1. For example, the image capture unit 2 is oriented such that the image is captured from a surrounding area U of the motor vehicle 1 to the rear. For example, the image is captured from a surrounding area U of the motor vehicle 1 to the rear of the kind that would otherwise be presented in a rearview mirror of the motor vehicle 1. In this manner, a rearview mirror in the form of an interior mirror, in the form of an exterior mirror or in the form of a side mirror can be substituted.

The screen 4 displays the image of the surrounding area U for a user 6 of the motor vehicle 1. For example, the user 6 is a driver of the motor vehicle 1. For example, the screen 4 is arranged in the motor vehicle such that it is viewable from a seat of the user 6 from a similar viewing angle to the exterior mirror replaced by the screen 4. For example, the screen 4 is arranged in the region of an A pillar of the motor vehicle 1.

The ascertaining unit 3 ascertains a line of vision 7 of the user 6. The line of vision 7 can indicate the direction in which the user 6 is currently looking. For example, the line of vision 7 describes the direction in which the user 6 is consciously looking. It is possible to ascertain the direction in which the pupils of the user 6 are oriented. By way of example, it is ascertained on what the user 6 is focusing his eyes.

A control unit 5 is designed to switch the screen 4 to a normal mode of operation or a power-saving mode on the basis of the line of vision 7 of the user 6. The screen 4 is switched to the normal mode of operation at least when the user 6 is looking in the direction of the screen 4. The screen 4 can be switched to the power-saving mode when the user 6 is not looking in the direction of the screen 4. In accordance with one development, the line of vision 7 of the user 6 is predictively forecast. In this case, the screen 4 can alternatively or additionally be switched to the normal mode of operation or the power-saving mode on the basis of a forecast line of vision. By way of example, the current line of vision 7 is used to forecast the direction in which the user 6 could look next. If the line of vision 7 is used to forecast that the user 6 could look at the screen 4 next, the screen can be switched to the normal mode of operation.

In the normal mode of operation, the screen 4 displays the image of the surrounding area from the image capture unit 2. For example, a brightness of the screen 4 is chosen in the normal mode of operation such that a highest possible readability or visibility of a displayed screen content on the screen 4 is ensured. By contrast, a power consumption of the screen 4 is reduced in the power-saving mode in comparison with the normal mode of operation. By way of example, a brightness of the screen 4 is reduced or the screen is switched off in the power-saving mode. If the brightness is reduced in the power-saving mode, there may be provision for the image of the surrounding area U also to be displayed in the power-saving mode. When the screen 4 is switched off, there may be provision for exclusively the background lighting of the screen 4 to be switched off or for the whole screen 4 to be switched off.

Figure 2:
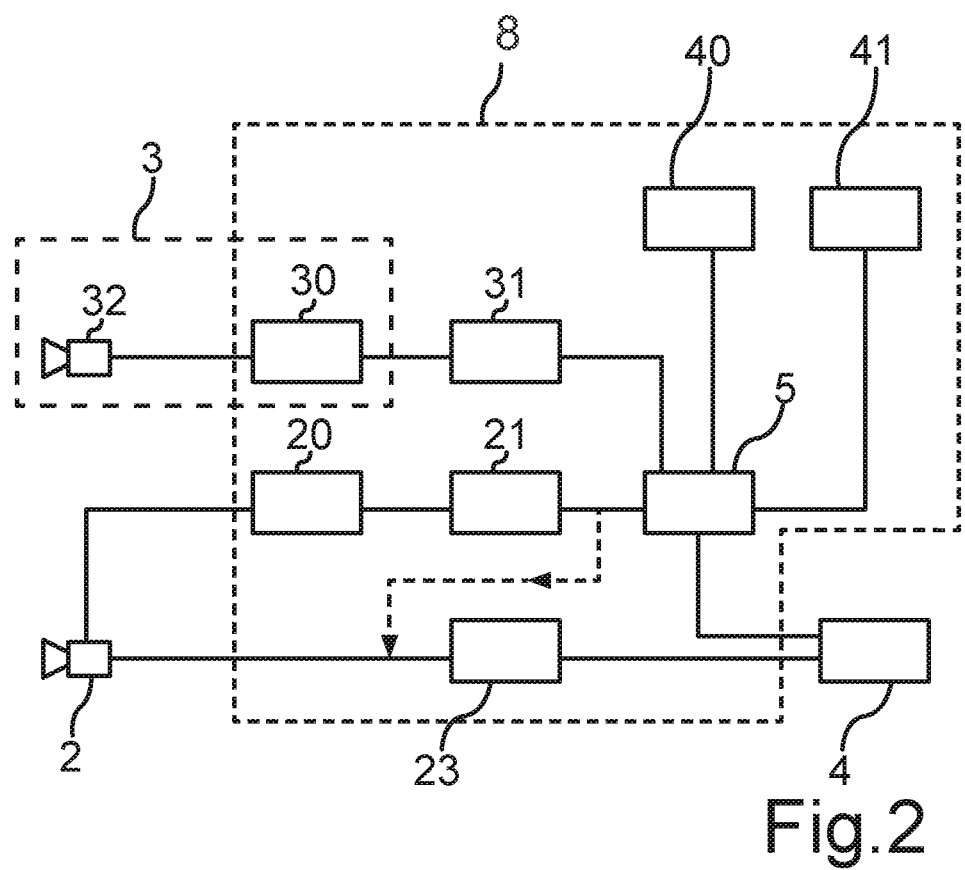
FIG. 2 is a block diagram of a system for substituting a rearview mirror.

FIG. 2 now shows a block diagram of the system 8. The image of the surrounding area can be provided for an object detection section 20 from the image capture unit 2. This involves the image or a video signal from the image capture unit 2 being used as an input signal for the object detection section 20. The object detection section 20 examines the image or the video signal for objects. By way of example, other road users or static objects (for example trees, marker posts, traffic lights, road signs or bridge piers) are detected as objects. Object data can be ascertained for the objects. The object data can include for example an object type (for example other motor vehicle, cyclist or pedestrian), a movement status (moving or nonmoving object), an object velocity, a direction of movement and/or a relative position of the object. The velocity and the relative position of the object are referenced to the motor vehicle 1, for example.

In a decision unit 21, a decision can be made as to whether an object that has been detected by the object detection section 20 is a critical object. In addition to the object data from the object detection section 20, further vehicle data and/or sensor data can be used for this purpose. Examples of these are current geoposition, map data (for example type of road traveled on, lane change), vehicle velocity, traffic situation (for example queue, overtaking maneuver, turning maneuver), weather information, status of an automated journey by the motor vehicle 1, ambient light information or date and time. The decision unit 21 decides whether a detected object has a criticality level that requires the attention of the user 6. For example, the decision unit 21 is based on an artificial neural network. In this case, the criticality of an object can be detected, or the criticality level can be ascertained, on the basis of machine learning (for example, "deep learning").

The information concerning whether a critical object has been detected in the image of the surroundings U is transmitted to the control unit 5. The control unit 5 can switch the screen 4 to the normal mode of operation at least while a critical object is detected in the image of the surrounding area U. This ensures that the user 6 can detect critical objects as quickly as possible.

The image of the surrounding area U, or the video signal from the image capture unit 2, is conditioned by a video processor 23 for presentation on the screen 4. This involves for example certain areas of the image being cut out for presentation on the screen 4 if the whole image is not of interest to the user 6. The video processor 23 can highlight critical objects in the image. By way of example, a marker or coloration of critical objects is added to the image by the video processor 23. This is effected for example on the basis of virtual reality or augmented reality. By way of example, the critical object can be highlighted in different ways depending on its criticality level. By way of example, critical objects having the highest criticality level can be presented in red and objects of a lower criticality level in green.

The ascertaining unit 3 can include a camera 32 that is arranged in an interior of the motor vehicle 1 such that a driver's seat of the motor vehicle 1 is in the capture area of the camera. For example, the camera 32 is oriented at the head height of the user 6 sitting in the driver's seat. A video signal from the camera 32 can be supplied to a detection unit 30. The detection unit 30 and the camera 32 together form the ascertaining unit 3. The detection unit 30 ascertains the direction in which the user 6 is looking. By way of example, this can be accomplished by ascertaining a pose of the head and/or eyes of the user 6. The pose of the head and/or eyes is detected for example from a video signal, showing the user 6, from the ascertaining unit 3. For example, the line of vision 7 of the user 6 is ascertained therefrom. A second detection unit 31 can ascertain from the line of vision 7 of the user whether the user 6 is looking at a component in the interior of the motor vehicle 1. This is ascertained for example on the basis of a position of the head of the user 6 in the interior of the motor vehicle 1 and from the line of vision 7. For example, it is ascertained whether the user 6 is looking at the screen 4. The information concerning whether the user 6 is looking at the screen 4 is provided to the control unit 5.

Additionally, the control unit 5 can be provided with status information about a driver state of the motor vehicle 1. By way of example, the vehicle data about the running state are provided by a sensor device 41. Additionally, the control unit 5 can be provided with preferences of the user 6 from an input device 40. On the basis of the preferences, the user 6 can indicate for example whether he fundamentally requires the screen 4 to be switched to the power-saving mode.

The control unit 5 can switch the screen 4 to the normal mode of operation or the power-saving mode on the basis of the information provided to it. For example, the screen 4 is switched to the power-saving mode or the normal mode of operation on the basis of the presence of a critical object, the line of vision 7, the running state of the motor vehicle 1 and/or the preference indications from the input apparatus 40. By way of example, the screen 4 is switched to the normal mode of operation only if this is permitted by the user preference. For example, the screen 4 is switched to the power-saving mode at most if a critical object has not been detected in the image of the surrounding area U. For example, the screen 4 is switched to the power-saving mode at most if the user 6 is not looking at it. On the basis of the running state, there may be provision for example for the screen 4 to be switched to the normal mode of operation whenever the motor vehicle 1 is on a multilane road or a velocity of the motor vehicle 1 exceeds a predetermined velocity limit value.

The exemplary embodiments show how the actuation of the screen 4, that is to say the switching either to the power-saving mode or to the normal mode of operation, is firstly able to reduce a power consumption of the motor vehicle 1 but secondly also ensures a high level of road safety for the motor vehicle 1.

A description has been provided with reference to examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a screen of a motor vehicle, the method comprising:
   capturing an image of a surrounding area of the motor vehicle;
   determining a current line of vision of a user of the motor vehicle;
   determining a forecast line of vision of the user which is predicted based on the current line of vision of the user;
   switching the screen to a normal mode of operation or a power-saving mode of operation based on the forecast line of vision, a power consumption of the screen being less in the power-saving mode of operation compared to a power consumption of the screen in the normal mode of operation; and
   displaying, by the screen, the image of the surrounding area at least while the screen is in the normal mode of operation.

2. The method as claimed in claim 1, wherein switching the screen to the power-saving mode of operation includes switching the screen off or reducing a brightness of the screen.

3. The method as claimed in claim 1, wherein switching the screen to the normal mode of operation is further based on at least one of a running state of the motor vehicle, a velocity of the motor vehicle, and a number of lanes of a route the motor vehicle travels on.

4. The method as claimed in claim 3, wherein the screen is switched to the normal mode of operation when the velocity of the motor vehicle is above a predetermined velocity limit value or when the number of lanes of the route the motor vehicle travels on is at least four lanes.

5. The method as claimed in claim 1, wherein capturing and displaying the image of the surrounding area simulates a function of at least one of an exterior mirror and a rearview mirror.

6. The method as claimed in claim 1, further comprising:
   detecting a road user, based on the image of the surrounding area, as a critical object based on at least one of an object type of the road user, a relative position of the road user with respect to the motor vehicle, and a relative velocity of the road user with respect to the motor vehicle; and
   operating the screen in the normal mode of operation when detecting the road user as the critical object.

7. The method as claimed in claim 6, further comprising highlighting the critical object on the screen.

8. The method as claimed in claim 7, further comprising:
   detecting a criticality level, based on the image of the surrounding area, for the critical object; and
   identifying the criticality level based on the highlighting of the critical object.

9. A motor vehicle, comprising:
   an image capturer configured to capture an image of a surrounding area of the motor vehicle;
   an ascertaining unit, comprising at least one camera, configured to determine a current line of vision of a user of the motor vehicle;
   a screen configured to display the image of the surrounding area, at least while the screen is in a normal mode of operation; and
   a controller configured to determine a forecast line of vision of the user which is predicted based on the current line of vision of the user, and to switch the screen to the normal mode of operation or a power-saving mode of operation based on the forecast line of vision, a power consumption of the screen being less in the power-saving mode of operation compared to a power consumption of the screen in the normal mode of operation.

10. The motor vehicle as claimed in claim 9, wherein the image capturer, the ascertaining unit, the screen, and the controller simulate a function of at least one of an exterior mirror and a rearview mirror, such that the at least one of the exterior mirror and the rearview mirror is not included in the motor vehicle.

11. The motor vehicle as claimed in claim 9, wherein when the controller switches the screen to the power-saving mode of operation, a black image is displayed on the screen with reduced brightness.

12. The motor vehicle as claimed in claim 9, wherein the controller is configured to switch the screen from the power-saving mode of operation to the normal mode of operation before the current line of vision of the user is in the direction of the screen, based on the forecast line of vision.

13. The motor vehicle as claimed in claim 9, wherein the screen is disposed in an interior of the motor vehicle in a region of an A pillar of the motor vehicle.

14. The motor vehicle as claimed in claim 9, wherein the controller is further configured to detect an object, based on the image of the surrounding area, as a critical object based on at least one of an object type of the object, a relative position of the object with respect to the motor vehicle, and a relative velocity of the object with respect to the motor vehicle, and to control the screen to be operated in the normal mode of operation when the object is detected as the critical object.

15. The motor vehicle as claimed in claim 14, wherein the controller is further configured to highlight the critical object on the screen and/or identify the critical object on the screen by use of a marker, frame, or coloration to identify the critical object.

16. The motor vehicle as claimed in claim 15, wherein the controller is further configured to detect a criticality level, based on the image of the surrounding area, for the critical object, and to identify the criticality level based on the highlighting of the critical object.

17. The motor vehicle as claimed in claim 14, wherein the object includes at least one of a moving object or a static object.

18. The motor vehicle as claimed in claim 9, wherein the controller is further configured to switch the screen to the normal mode of operation or the power-saving mode of operation based on a user preference input by the user.

* * * * *